US009828262B2

(12) United States Patent
Blumenschein et al.

(10) Patent No.: US 9,828,262 B2
(45) Date of Patent: Nov. 28, 2017

(54) METHOD FOR REMOVING CALCIUM, BARIUM, MAGNESIUM AND STRONTIUM FROM FRAC FLOWBACK

(71) Applicant: Veolia Water Solutions & Technologies Support, Saint-Maurice (FR)

(72) Inventors: Charles D. Blumenschein, Pittsburgh, PA (US); Mark W. Hess, Zelienople, PA (US); Kashi Banerjee, Moon Township, PA (US)

(73) Assignee: Veolia Water Solutions & Technologies Support, Saint-Maurice (FR)

( * ) Notice: Subject to any disclaimer, the term of this patent is extended or adjusted under 35 U.S.C. 154(b) by 1046 days.

(21) Appl. No.: 13/829,576

(22) Filed: Mar. 14, 2013

(65) Prior Publication Data

US 2013/0248455 A1  Sep. 26, 2013

Related U.S. Application Data

(60) Provisional application No. 61/615,496, filed on Mar. 26, 2012.

(51) Int. Cl.
*C02F 1/52* (2006.01)
*C02F 1/56* (2006.01)
(Continued)

(52) U.S. Cl.
CPC ............ *C02F 1/52* (2013.01); *C02F 1/5236* (2013.01); *C02F 1/38* (2013.01); *C02F 1/56* (2013.01);
(Continued)

(58) Field of Classification Search
None
See application file for complete search history.

(56) References Cited

U.S. PATENT DOCUMENTS 6,210,588 B1* 4/2001 Vion ................. B01D 21/0018
210/711
8,318,027 B2  11/2012 McGuire
(Continued)

FOREIGN PATENT DOCUMENTS

WO  2010151729 A1  12/2010

OTHER PUBLICATIONS

Olmsted, John, and Gregory Williams, "Chemistry, the Molecular Science", 2nd edition, Published by Wm. C. Brown, Dubuque, Iowa, 1997.*
(Continued)

*Primary Examiner* — Bobby Ramdhanie
*Assistant Examiner* — Jonathan Peo
(74) *Attorney, Agent, or Firm* — Coats & Bennett, PLLC

(57) ABSTRACT

A method of removing barium, calcium, strontium, and magnesium from frac flowback. A sulfate reagent and carbonate reagent are mixed with the frac flowback, causing barium, calcium, strontium, and magnesium to precipitate. The precipitants are crystallized and the resulting frac flowback and crystals are separated into relatively heavy solids and a stream of relatively light solids. The stream of relatively light solids is subjected to a further separation process that produces sludge that is recycled to aid in the crystallization process and a treated effluent which is recycled to the fracking operation or collected and used in another fracking operation.

10 Claims, 2 Drawing Sheets

(51) Int. Cl.
 *C02F 1/38* (2006.01)
 *C02F 5/02* (2006.01)
 *C02F 11/12* (2006.01)
 *C02F 103/10* (2006.01)

(52) U.S. Cl.
 CPC ............... *C02F 5/02* (2013.01); *C02F 11/127* (2013.01); *C02F 2001/5218* (2013.01); *C02F 2103/10* (2013.01); *C02F 2305/12* (2013.01)

(56) References Cited

U.S. PATENT DOCUMENTS

| | | | | |
|---|---|---|---|---|
| 2002/0088758 | A1* | 7/2002 | Blumenschein | C02F 1/5245 210/712 |
| 2006/0213832 | A1* | 9/2006 | Hudson | C02F 3/12 210/626 |
| 2007/0241041 | A1* | 10/2007 | Shimamura | C02F 11/127 210/197 |
| 2008/0053900 | A1* | 3/2008 | Shafer | C02F 9/00 210/631 |
| 2008/0135478 | A1 | 6/2008 | Zuback et al. | |
| 2009/0107915 | A1* | 4/2009 | Skinner | C02F 9/00 210/636 |
| 2010/0125044 | A1* | 5/2010 | Keister | E21B 21/068 507/200 |
| 2011/0259761 | A1 | 10/2011 | McGuire et al. | |

OTHER PUBLICATIONS

"Treating Shale Gas Frac Water at the Well Site," Industral WaterWorld (Pennwell Corp., 2013), 2 pp. http:/www.waterworld.com/articles/2010/09/treating-shale-gas-frac-water.html.

"Hydraulic Fracture Stimulation or Fraccing—a Safe Way to Extract Coal Seam Gas", 4 pp. http://origintogether.com/redirector.php?file=/wp-content/factsheets/Fracture%20stimulation%20or%20fraccing.pdf.

"Hydraulic fracturing" Wikipedia, 18 pp. (Jan. 22, 2013) http://en.wikipedia.org/wiki/Hydraulic_fracturing.

* cited by examiner

METHOD FOR REMOVING CALCIUM, BARIUM, MAGNESIUM AND STRONTIUM FROM FRAC FLOWBACK

CROSS-REFERENCE TO RELATED APPLICATION

This application claims priority under 35 U.S.C. §119(e) from the following U.S. provisional application: Application Ser. No. 61/615,496 filed on Mar. 26, 2012. That application is incorporated in its entirety by reference herein.

FIELD OF THE INVENTION

The present invention relates to gas and oil recovery processes. More particularly, the present invention relates to a process for recovering gas and oil from a geological formation and treating produced water or frac flowback resulting from the recovery of oil or gas so as to reduce the hardness in the produced water or frac flowback, enabling the treated produced water or frac flowback to be recycled or otherwise reused.

BACKGROUND

Fossil fuels remain an important source of energy in America and around the world. For example, natural gas is used to produce energy, to include heat and electricity, in commercial and residential settings. These resources are also components of numerous products used daily. For example, oil is a component in plastics, fuels, toiletries, cleaning products, clothing, and health products, among many others. Supplies of oil and natural gas, however, are finite. There is also a growing interest in many countries towards producing more of their own oil and natural gas resources in order to reduce or end dependency on foreign supplies. Thus, it is important for oil and natural gas recovery operations to responsibly optimize their productions of these resources.

One way to optimize gas and oil production is to utilize a hydraulic fracturing process. Hydraulic fracturing, or "fracking," utilizes high pressure sand and water mixtures to restore flow rates of oil and natural gas in mining operations. In hydraulic fracturing, the high pressure mixtures are injected into to oil and gas wells. The high pressure contact between the mixture and the rock forms cracks in the rock containing the resource being mined. This, in turn, allows more of the resources in the rock to flow to locations in the well where they may be recovered. In the United States, hydraulic fracturing has resulted in the recovery of billions of barrels of additional oil and trillions of cubic feet of additional natural gas.

Water is a crucial part of the hydraulic fracturing process. In the United States, a hydraulic fracturing operation for a single well utilizes more than 5 million gallons of water. In order to preserve water resources, there is a strong interest in recycling water already present in mining operations, such as produced water. Produced water is water that is naturally present in oil and natural gas reservoirs and is extracted or co-extracted during recovery operations. As will be discussed later, hydraulic fracking used to recover natural gas produces what is sometimes referred to as frac flowback or frac water, which is an example of produced water. Recycling produced water, instead of using new water in hydraulic fracturing, leads to environmental and operational benefits. For example, recycling produced water for use in hydraulic fracturing may preserve water resources, especially in areas where there is little natural water. Recycling produced water also saves expenses related to shipping water to the drilling site, a consideration that is especially sensitive when drilling occurs in areas that are remote. Also, there is a potential reduction in frac water treatment chemicals, such as scale inhibitors, currently used in the industry.

One barrier to recycling produced water for use in hydraulic fracturing is that produced water contains high concentrations of scale forming constituents, such as calcium, barium, strontium, and magnesium. For example, a typical Marcellus Shale produced water would include approximately 10,600 mg/l of calcium, 10,100 mg/l of barium, 3,500 mg/l of strontium, and 973 mg/l of magnesium. These high concentrations should be reduced by at least 80% so that the produced water could be used in hydraulic fracturing without significant scaling. As such, there is a need for an efficient process to treat produced water to reduce the scaling potential thereof so that it may be recycled and utilized in hydraulic fracturing operations.

SUMMARY OF THE INVENTION

The present invention relates to a process for removing scale forming compounds from frac flowback such that, once treated, the frac flowback can be recycled or used in another fracking operation.

In one embodiment of the present invention, a sulfate reagent and a carbonate reagent are mixed with the frac flowback such that barium, calcium, strontium, and/or magnesium are precipitated from the frac flowback. Once these divalent cations, which tend to cause scaling, are removed from the frac flowback, the treated frac flowback can be reused in a fracking operation.

In another aspect of the present invention, compounds that include divalent cations are precipitated from the frac flowback water and the precipitants are crystallized in a crystallization tank. The frac flowback and crystals are directed from the crystallization tank to a first solids separator which separates the frac flowback and crystals into relatively heavy solids and a stream containing relatively light solids. The relatively heavy solids are disposed of or further treated prior to disposal. The stream containing the relatively light solids is directed to a second solids separator that separates the stream into a treated effluent and sludge. Sludge is recycled from the second solids separator to the crystallization tank, where the sludge functions as seeding material for the crystallization process. The treated effluent from the second solids separator can be recycled to the original gas well or can be utilized in other fracking operations.

Other objects and advantages of the present invention will become apparent and obvious from a study of the following description and the accompanying drawings, which are merely illustrative of such invention.

DESCRIPTION OF PREFERRED EMBODIMENT

With further reference to the drawings, the present invention entails a system and process for treating frac flowback or produced water. As used herein, the terms "frac flowback"

and "produced water" are used interchangeably and mean the same. Frac flowback and produced water mean water produced as a result of recovering oil or gas from an oil or gas-bearing formation.

The present invention entails a method for treating frac flowback resulting from a gas or oil recovery operation and for removing certain contaminants from the frac flowback such that the treated frac flowback can be reused in a fracking operation. More particularly, the frac flowback being treated typically includes divalent cations, such as calcium, magnesium, barium, and strontium, that have the potential to cause scaling. Thus the system and process of the present invention are designed to remove a substantial portion of these divalent cations from the frac flowback.

Figure 1:
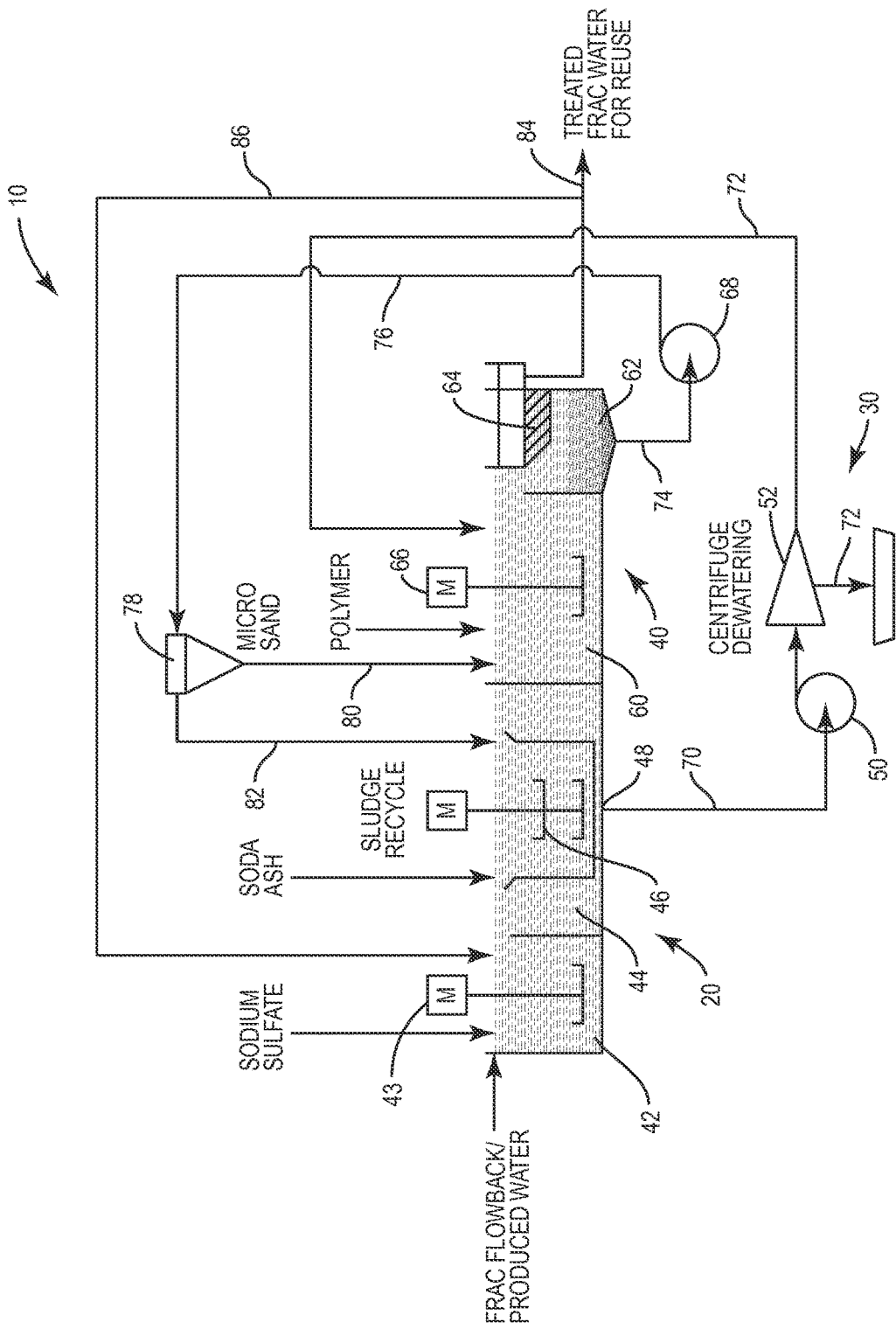
FIG. 1 is a schematic illustration of the system and process of the present invention.

Turning now to the drawings, FIG. 1 shows one embodiment for a system 10 for treating frac flowback. As seen in FIG. 1, the system comprises a chemical treatment subsystem 20, a primary solids separator 30, and a secondary solids separation system 40.

Chemical treatment subsystem 20 comprises a reactor or crystallization tank 42 that includes a mixer 43 and an inlet for receiving the frac flowback. Tank or reactor 42 is sometimes referred to as a reactor but it is understood that this structure can also be a crystallization tank. Thus, the term "reactor" as used herein includes a crystallization tank. In addition, there is provided a chemical injection site adjacent to reactor 42 for injecting one or more chemicals into the reactor.

Located downstream from reactor 42 is a crystallization tank 44. Crystallization tank 44 includes a vertical tube mixer 46. In addition, there is provided a chemical injection site adjacent to crystallization tank 44 for injecting one or more selected chemicals into the crystallization tank. As will be explained below, the vertical tube mixer 46 induces frac flowback into the confines of the mixer and moves the frac flowback vertically between the exterior walls of the mixer, while at the same time facilitating the crystallization of precipitants that are produced as a result of the chemical reactions in reactors 42 and 44.

Crystallization tank 44 includes an outlet 48. Frac flowback and resulting crystals are directed from the crystallization tank 44 out the outlet 48 into line 70. Line 70 leads to a pump 50 which is effective to pump the frac flowback and crystals therein to the primary solids separator 30. In the embodiment illustrated, the primary solids separator 30 comprises a centrifuge dewatering device 52. Other types of solids separators can be used such as filter presses, etc. In any event, as is explained later, the function of the primary solids separator 30 is to separate the frac flowback and crystals therein into relatively heavy solids and a stream having relatively light solids. The heavier solids are directed into line 72 and, in conventional fashion, can be subsequently treated for appropriate disposal. The stream having the relatively light solids is directed from the primary solids separator 30 into line 72, which leads to the secondary solids separator indicated generally by the numeral 40.

In the embodiment illustrated in FIG. 1, the secondary solids separator 40 comprises a ballasted flocculation system. Ballasted flocculation system 40 includes one or more mixing tanks or reactors. In the embodiment illustrated, there is provided one mixing tank 60. Mixing tank 60 includes a mixer 66. Mixer 66 could, in some embodiments, comprise a vertical tube mixer such as that incorporated into the crystallization tank 44. In addition, various chemical injection sites can be provided adjacent mixing tank 60. For example, in some embodiments, it may be desirable to inject a flocculant into the mixing tank 60.

Located downstream of the mixing tank 60 in the ballasted flocculation system is a settling tank 62. Settling tank 62 is provided with separator plates or lamella 64 to facilitate the settling of ballasted flocs that result from the addition of a ballasted material in the mixing tank. In some embodiments, the ballasted material is an insoluble granular material, such as microsand. As will be described later, sludge comprising flocs settles in the bottom portion of the settling tank 62 and is directed through line 74 to a sludge pump 68.

Sludge pump 68 is operative to pump the sludge into line 76, which leads to a hydrocyclone 78. Hydrocyclone 78 separates the ballasted material from the sludge. Separated ballasted material is directed from the hydrocyclone 78 via line 80 into the mixing tank 60. Separated sludge is directed from the hydrocyclone 78 via line 82 into the crystallization tank 44, where it is mixed with the frac flowback and selected chemicals added in tanks 42 and 44.

A treated effluent, treated frac flowback, is directed from the settling tank 62 via line 84. Treated frac flowback can now be used in a fracking operation. The treated frac flowback can be recycled to the geological formation that produced the frac flowback, or the treated frac flowback can be used to frac other geological formations. In some instances, it is desirable to recycle all or a portion of the treated frac flowback to various parts of the system for additional treatment. As shown in FIG. 1, there is provided a recycle line 86 that extends from effluent line 84 to reactor 42. By providing appropriate valves, the treated frac flowback can be recycled via line 86 to tank 42 or to other reactors or tanks of the system.

Figure 2:
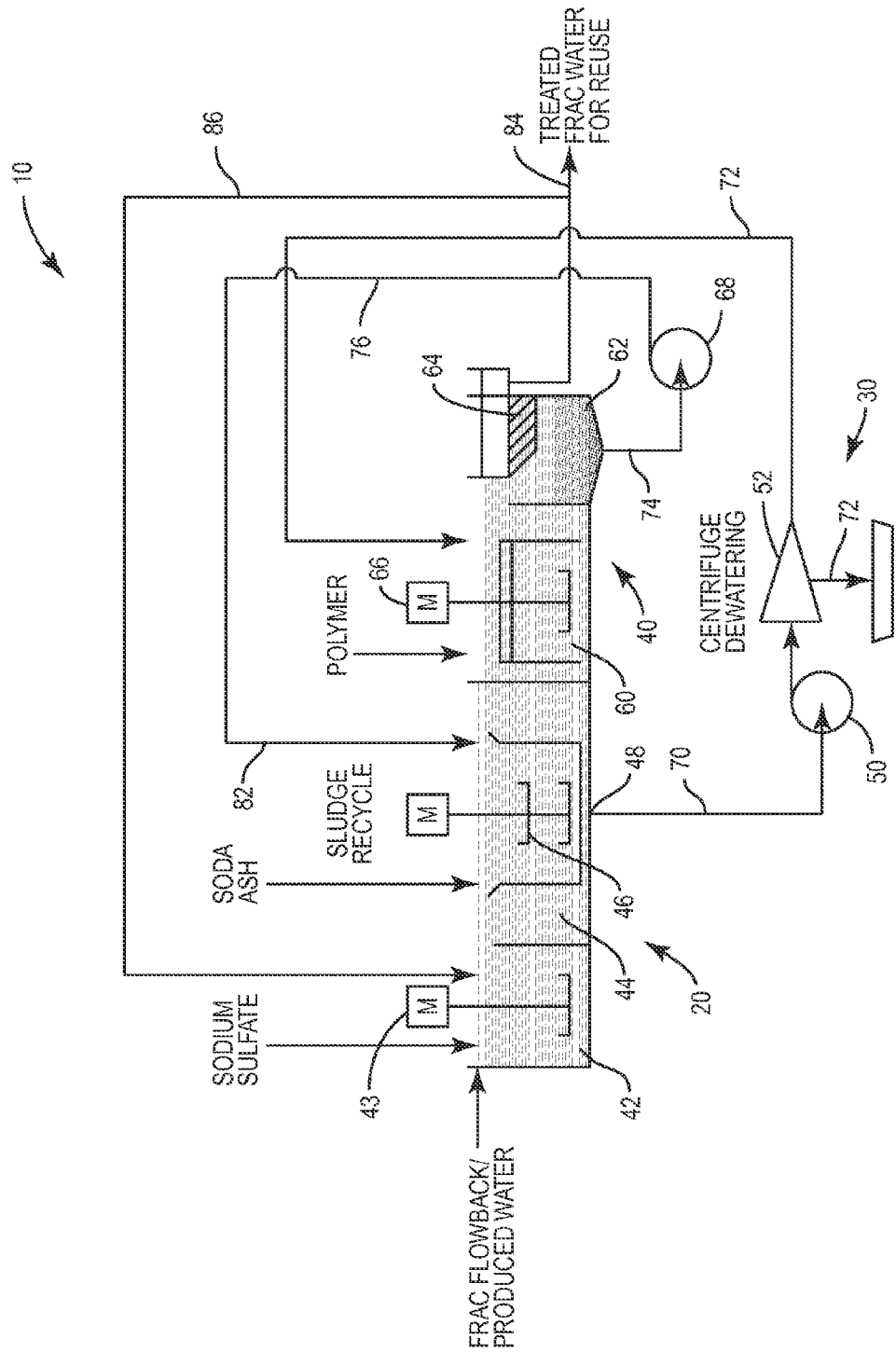
FIG. 2 is a schematic illustration of an alternate system and process of the present invention.

Turning to FIG. 2, another embodiment for the system of the present invention is shown. This embodiment is similar to that discussed above and shown in FIG. 1. The basic difference is that the system shown in FIG. 1 is a ballasted flocculation system and the system shown in FIG. 2 does not utilize ballast to settle precipitants and crystals. Otherwise, the systems and process are essentially identical. In the FIG. 2 embodiment, the secondary solids separator 40 is shown to have a single mixing tank 60. It should be understood and appreciated that there may be multiple mixing tanks ahead of the settling tank 62. In addition to adding a flocculent, in some embodiments it may be beneficial to add a coagulant to the frac flowback in solids separator 40.

As noted above, the process of the present invention aims to reduce the concentration of divalent cations (calcium, magnesium, barium, and strontium) in the frac flowback so that the treated frac flowback can be reused in a gas or oil recovery process. By removing or reducing the concentration of divalent cations, the scaling potential of the treated frac flowback is reduced.

In one exemplary process, frac flowback is directed to the system depicted in FIG. 1. Frac flowback enters the first reactor 42 of the chemical treatment subsystem 20. In the first reactor, a sulfate salt is added to the produced water. One example of a sulfate salt that may be used is sodium sulfate. Another example of a sulfate salt that may be used is potassium sulfate. The sodium sulfate and frac flowback are mixed and, in a preferred embodiment, it is contemplated that the mixing occurs for approximately 1 to 5 minutes. This will result in some of the divalent cations being precipitated from the frac flowback. That is, divalent cations, such as calcium, barium, strontium, and magnesium, will begin to precipitate as calcium sulfate, barium sulfate, strontium sulfate, and magnesium hydroxide. In a preferred embodiment, the sulfate salt is effective to remove barium as barium sulfate. This reaction occurs relatively fast. Preliminary testing indicates that with sodium sulfate, for example, the process quickly removes all or substantially all the barium. The dosage of the sulfate salt can vary but it has been found that a sulfate-to-barium stoichiometric ratio of approximately 1:1 is effective to remove all or substantially all of the barium in the frac flowback. It may be desirable to dose the sulfate to less than the barium on a stoichiometric basis in order to not have residual sulfate in the treated frac water. This is because sulfate tends to be a scale former as well, especially if reused and comes in contact with barium in the well formation.

Frac flowback and precipitants in the mixing tank 42 are directed to the crystallization tank 44. Here, a carbonate reagent is added to the frac flowback in the crystallization tank in order to form crystals. Various carbonate reagents can be added to the crystallization tank 44. In a preferred embodiment, the carbonate reagent is soda ash, sodium carbonate. Thus, in the crystallization tank, the presence of the carbonate reagent will result in the divalent cations continuing to precipitate from the frac flowback in the form of sulfate and carbonate species or complexes. In the embodiment illustrated herein, the chemical reagents are mixed with the frac flowback in the vertical tube mixer 46 to improve crystal formation. In one embodiment, the contact time in the crystallization tank is approximately 5 to 30 minutes. As will be discussed later, the sludge that is produced by the secondary solids separator 40 is recycled back to the crystallization tank 44, where the recycled sludge is mixed with the frac flowback and the carbonate and sulfate reagents. This recycling and mixing allow the sludge produced by the secondary solids separator 40 to act as a seed material to further aid crystallization.

Frac flowback and the crystals in the crystallization tank 44 are directed to the primary solids separator 30. In the primary solids separator 30, a majority of the crystals are removed as a solid sludge and a filtrate is produced. In effect, the solids separator 30 separates the frac flowback and crystals into relatively heavy solids and a stream having relatively light solids. In some embodiments, up to 98% of total suspended solids may be removed by the primary solids separator 30. Some embodiments may remove suspended solid particles based on size and/or weight. For example, in a preferred embodiment, larger, heavier particles are removed as sludge while residual smaller, lighter particles remain in the filtrate or the stream having the relatively light solids. Sludge produced in this step may be disposed of through landfill disposal or other means and, in some cases, can be further treated prior to disposal.

The stream having the relatively light solids is directed via line 72 to the secondary solids separator 40. That is, the stream having the relatively light solids is directed to the mixing tank 60 of the ballasted flocculation system. Here the stream having the relatively light solids is mixed (by mixer 66) with a ballast, typically microsand, along with a polymer that promotes flocculation. This creates or forms flocs in the mixing tank 60. The flocs basically entail the ballast with the lighter solids being agglomerated around the ballast. In a preferred embodiment, the ballasting agent is, as noted above, microsand with particle sizes ranging from between 80 and 130 microns. In terms of dosing, the ballast is added at a rate of approximately 5 g/l to 10 g/l.

Frac flowback and flocs in mixing tank 60 are directed to the settling tank 62. Here, the ballasted flocs settle to the bottom of the settling tank 62 and form sludge. That is, the sludge settled in the bottom of settling tank 62 comprises the lighter solids found in the stream produced by the primary solids separator 30, along with the ballasted flocs produced in the mixing tank 60.

Sludge in the bottom of settling tank 62 is pumped by pump 68 through line 76 to the hydrocyclone 78. Hydrocyclone 78 separates the ballast from the sludge. The ballast is recycled to mixing tank 60, while at least a portion of the sludge is recycled to the crystallization tank 44, where it acts as seed material for the crystallization process carried out in the crystallization tank.

Settling tank 62 produces an effluent which, in this case, is the treated frac flowback. It is directed from the settling tank 62 via line 84 and, as discussed above, can be reused for fracking. In some cases, it may be desirable to recycle the treated frac flowback or a portion thereof to earlier components of the treatment system to further reduce the concentration of divalent cations that cause scaling. As seen in FIG. 1, by utilizing a control valve between lines 84 and 86, all or a portion of the treated frac flowback can be recycled to reactor 42. This can improve the quality of the treated frac flowback.

Pilot testing was conducted for a frac flowback stream having the following concentrations:

| | |
|---|---|
| calcium - | 10,500 mg/L |
| barium - | 10,500 mg/L |
| strontium - | 3,460 mg/L |
| magnesium - | 987 mg/L |

The frac flowback stream had a pH of 6.4. Approximately 19 g/L of sodium sulfate were added to the frac flowback in reactor 42, which constitutes a stoichiometric percentage relative to barium of 115%. Approximately 35 g/L of soda ash were added in the crystallization tank 44. Further, approximately 740 mg/L of sodium hydroxide were added to the frac flowback, resulting in a pH increase up to 10.2. The treated effluent in line 84 was tested. It was found that the calcium concentration had been reduced from 10,500 mg/L to 2,380 mg/L, a reduction of 77%. Barium was reduced from 10,500 mg/L to 3 mg/L, effectively a 100% reduction. Strontium was reduced from 3,460 mg/L to 383 mg/L, or an 89% reduction. Finally, magnesium was reduced from 987 mg/L to 695 mg/L, a reduction of 30%. It is hypothesized that increasing the amount of carbonate added to the frac flowback will increase the reduction in calcium, strontium. Increasing the pH set point will then increase the reduction of magnesium.

In an alternate design, the carbonate reagent may be added prior to the sulfate reagent being added or, in some embodiments, the two reagents could be added simultaneously to the same reactor. However, there are advantages to staging the reactions by initially adding a sulfate reagent and thereafter, in a separate reactor, adding the carbonate reagent. This is because barium carbonate is more soluble than barium sulfate. If the objective is to remove all or substantially all barium, it appears more efficient to first add sodium sulfate or another sulfate reagent. In a preferred embodiment, separate sulfate and carbonate reactors are used so as to reduce the effects of competing reactions.

The present invention presents a cost effective and efficient method for removing hardness from frac flowback to produce a treated frac flowback effluent. The treated frac flowback can be recycled to the gas or oil well that produced the frac flowback in the first place. The treated frac flowback can also be routed to another gas or oil well or even collected and transported to another fracking facility. The staging of the injection of the sulfate reagent and the carbonate reagent, along with the crystallization process and the unique utilization of the primary and secondary solids separator, enables hardness compounds to be removed from the frac flowback such that the treated frac flowback effluent includes a substantial reduction in calcium, magnesium, barium, and strontium.

The present invention may, of course, be carried out in other ways than those specifically set forth herein without departing from essential characteristics of the invention. The present embodiments are to be considered in all respects as illustrative and not restrictive, and all changes coming within the meaning and equivalency range of the appended claims are intended to be embraced therein.

What is claimed is:

1. A method of recovering and treating frac flowback by removing hardness and suspended solids from the frac flowback, the method comprising:
   treating the frac flowback to reduce the concentration of the hardness ions in the frac flowback, treating the frac flowback comprising:
   i. directing the frac flowback into a reactor and mixing the frac flowback with a sulfate salt;
   ii. after mixing the sulfate salt with the frac flowback, directing the frac flowback to a crystallization tank having a vertical tube crystallizer;
   iii. in the crystallization tank, mixing a carbonate reagent with the frac flowback;
   iv. precipitating sulfate and carbonate hardness compounds from the frac flowback by mixing the sulfate salt and the carbonate reagent with the frac flowback;
   v. crystallizing the sulfate and carbonate hardness compounds and forming crystals by circulating said sulfate salt and carbonate hardness compounds; through the vertical tube crystallizer in the crystallization tank;
   vi. directing at least some of the frac flowback from the crystallization tank downstream to a secondary solids separator;
   vii. directing at least a portion of the frac flowback and crystals from the crystallization tank through an outlet formed in the bottom portion of the crystallization tank;
   viii. directing the frac flowback and crystals from the outlet in the bottom portion of the crystallization tank to a primary solids separator disposed in a side stream relative to the reactor, crystallization tank and secondary solids separator;
   ix. in the primary solids separator, separating the frac flowback and crystals into relatively heavy solids in comparison to the frac flowback and crystals; and a stream having relatively light solids in comparison to the frac flowback and crystals;
   x. mixing the stream of relatively light solids with the frac flowback at a point downstream of the crystallization tank;
   xi. subjecting the frac flowback and stream of relatively light solids to a separation process in the secondary solids separator which separates the frac flowback and the stream of relatively light solids into a clarified effluent and sludge; and
   xii. seeding the crystallization tank by recycling at least the portion of the sludge produced by the secondary solids separator to the crystallization tank and mixing the sludge with the frac flowback and the carbonate reagent in the vertical tube crystallizer in the crystallization tank;
   wherein the secondary solids separator is a ballasted flocculation system including at least one mixing tank and a settling tank and the method further includes:
   a. directing the stream having relatively light solids to the mixing tank of the ballasted flocculation system;
   b. mixing an insoluble granular material and a flocculant with the stream having relatively light solids in the mixing tank of the ballasted flocculation system and forming flocs that include the insoluble granular material and the relatively light solids from the stream having relatively light solids;
   c. forming a stream having both the relatively light solids and the flocs and directing into the settling tank and settling the flocs where the flocs form a part of the sludge;
   d. directing the sludge from the settling tank to a separator and separating the insoluble granular material from the sludge and recycling the insoluble granular material to the mixing tank of the ballasted flocculation system; and
   e. directing the sludge separated from the insoluble granular material to the crystallization tank and seeding the crystallization tank with the sludge separated from the insoluble granular material.

2. The method of claim 1 wherein the hardness comprises divalent cations and wherein the divalent cations combine with sulfate and carbonate and precipitate from the frac flowback and form at least a part of the relatively heavy solids separated by the primary solids separator.

3. A process of removing hardness and suspended solids from frac flowback, comprising:
   directing the frac flowback into a reactor and mixing the frac flowback with a reagent for precipitating hardness;
   precipitating hardness from the frac flowback to form hardness precipitants;
   after mixing the reagent with the frac flowback, directing the frac flowback to a crystallization tank having a vertical tube crystallizer;
   directing at least some of the frac flowback downstream from the crystallization tank to a secondary solids separator;
   in the crystallization tank, circulating the frac flowback and hardness precipitants vertically through the vertical tube crystallizer and forming crystals in the crystallization tank;
   directing at least a portion of the frac flowback and the crystals formed in the crystallization tank from the crystallization tank and through an outlet disposed in a bottom portion of the crystallization tank below the vertical tube crystallizer;
   from the outlet in the bottom portion of the crystallization tank, directing the frac flowback and the crystals to a primary solids separator and separating the frac flowback and the crystals removed from the crystallization tank into relatively heavy solids in comparison to the frac flowback and the crystals and a stream having relatively light solids in comparison to the frac flowback and the crystals;
   directing the stream of relatively light solids produced by the primary solids separator downstream of the crystallization tank where the stream of relatively light solids is mixed with the frac flowback in the secondary solids separator;
   in the secondary solids separator, separating the frac flowback and relatively light solids produced by the primary solids separator into a clarified effluent and sludge; and seeding the crystallization tank by recycling at least a portion of the sludge produced by the secondary solids separator to the crystallization tank and mixing the sludge with the frac flowback and the crystals in the crystallization tank.

4. The process of claim 3 wherein the process includes a mainstream that includes the reactor, crystallization tank and secondary solids separator and wherein the primary solids separator is disposed in a side stream.

5. The process of claim 3:
wherein the reactor, crystallization tank and secondary solids separator are disposed in a mainstream and wherein the primary solids separator is disposed in a side stream;
pumping the frac flowback and crystals from the outlet disposed in the bottom portion of the crystallization tank to the primary solids separator disposed in the side stream;
wherein the secondary solids separator comprises a settling tank;
directing at least some of the frac flowback directly from the crystallization tank to a flocculation zone disposed in the mainstream between the crystallization tank and the settling tank and mixing a polymer with the frac flowback in the flocculation zone; and
recycling a portion of the clarified effluent to the reactor and mixing the clarified effluent with the frac flowback and the reagent.

6. The process of claim 5 further including injecting microsand into the frac flowback at a point between the crystallization tank and the settling tank.

7. The process of claim 5 wherein the secondary solids separator comprises at least one mixing tank followed by the settling tank and wherein the process further includes:
directing the stream having the relatively light solids to the mixing tank of the secondary solids separator and mixing the polymer with the stream of relatively light solids produced by the primary solids separator and forming flocs that include the relatively light solids; and
directing the flocs to the settling tank and settling the flocs such that the flocs form at least a portion of the sludge.

8. The process of claim 3 including removing up to 98% of suspended solids from the frac flowback by discharging the suspended solids out the outlet formed in the bottom portion of the crystallization tank where the suspended solids are directed to the primary solids separator.

9. The process of claim 3 wherein the reagent for precipitating hardness is a sulfate salt and wherein the sulfate salt is mixed with the frac flowback in the reactor that is disposed upstream of the crystallization tank; and wherein the process further includes mixing a carbonate reagent with the frac flowback in the crystallization tank.

10. The process of claim 3 wherein the frac flowback includes barium and wherein the reagent for precipitating hardness is a sulfate salt and wherein the process includes dosing the frac flowback with the sulfate salt such that the stoichiometric ratio of sulfate to barium in the frac flowback is approximately 1:1.

* * * * *